United States Patent
Park et al.

(10) Patent No.: US 11,659,155 B2
(45) Date of Patent: May 23, 2023

(54) CAMERA

(71) Applicant: LG INNOTEK CO., LTD., Seoul (KR)

(72) Inventors: Jung Ah Park, Seoul (KR); Jeong Woo Woo, Seoul (KR); Min Kyu Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 43 days.

(21) Appl. No.: 17/266,411

(22) PCT Filed: Aug. 2, 2019

(86) PCT No.: PCT/KR2019/009645
§ 371 (c)(1),
(2) Date: Feb. 5, 2021

(87) PCT Pub. No.: WO2020/032485
PCT Pub. Date: Feb. 13, 2020

(65) Prior Publication Data
US 2021/0329218 A1    Oct. 21, 2021

(30) Foreign Application Priority Data

Aug. 7, 2018 (KR) .................. 10-2018-0091898

(51) Int. Cl.
*H04N 13/254* (2018.01)
*H04N 13/271* (2018.01)

(52) U.S. Cl.
CPC ......... *H04N 13/271* (2018.05); *H04N 13/254* (2018.05)

(58) Field of Classification Search
CPC .......................... H04N 13/271; H04N 13/254
USPC .......................................................... 348/46
See application file for complete search history.

(56) References Cited

U.S. PATENT DOCUMENTS

| 10,225,511 B1 * | 3/2019 | Lim ..................... H04N 9/8042 |
| 2011/0028183 A1 * | 2/2011 | Yun .......................... G06T 7/586 |
| | | 455/556.1 |
| 2011/0051118 A1 | 3/2011 | Sato et al. |

(Continued)

FOREIGN PATENT DOCUMENTS

| CN | 102016636 A | 4/2011 |
| JP | 5584196 B2 | 9/2014 |

(Continued)

*Primary Examiner* — Amir Shahnami
(74) *Attorney, Agent, or Firm* — Birch, Stewart, Kolasch & Birch, LLP

(57) ABSTRACT

A camera according to an embodiment of the present invention comprises: a light-emitting module for configured to output output light according to a set control mode; a light-receiving module configured to receive input light corresponding to the output light according to the control mode; and a control module configured to detect at least one of presence of a subject and a distance from the subject on the basis of the input light, reset the control mode according to a detection result, control an output of the light-emitting module and an input of the light-receiving module according to the reset control mode, and generate a depth map for the subject on the basis of the input light which is input according to the reset control mode.

18 Claims, 4 Drawing Sheets

(56) References Cited

U.S. PATENT DOCUMENTS

| | | | |
|---|---|---|---|
| 2014/0354179 A1* | 12/2014 | Newton | H05B 47/115 |
| | | | 315/297 |
| 2015/0185325 A1 | 7/2015 | Park et al. | |
| 2016/0094797 A1 | 3/2016 | Yoon et al. | |
| 2016/0352998 A1 | 12/2016 | Huang | |
| 2017/0093491 A1* | 3/2017 | Breuer | H04W 4/026 |
| 2018/0063403 A1* | 3/2018 | Ryu | H04N 5/232121 |
| 2019/0174042 A1* | 6/2019 | Johannessen | H04N 7/18 |

FOREIGN PATENT DOCUMENTS

| | | |
|---|---|---|
| KR | 10-2015-0076760 A | 7/2015 |
| KR | 10-2016-0038460 A | 4/2016 |
| KR | 10-2018-0023785 A | 3/2018 |

\* cited by examiner

[FIG. 1]
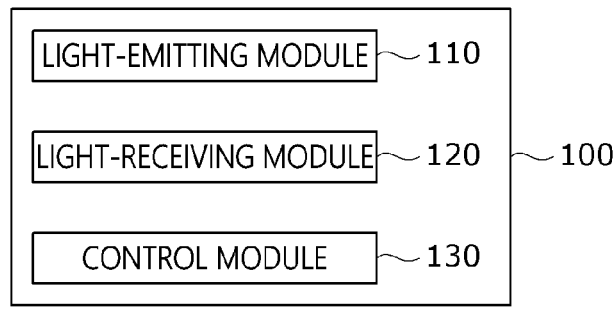
[FIG. 2]
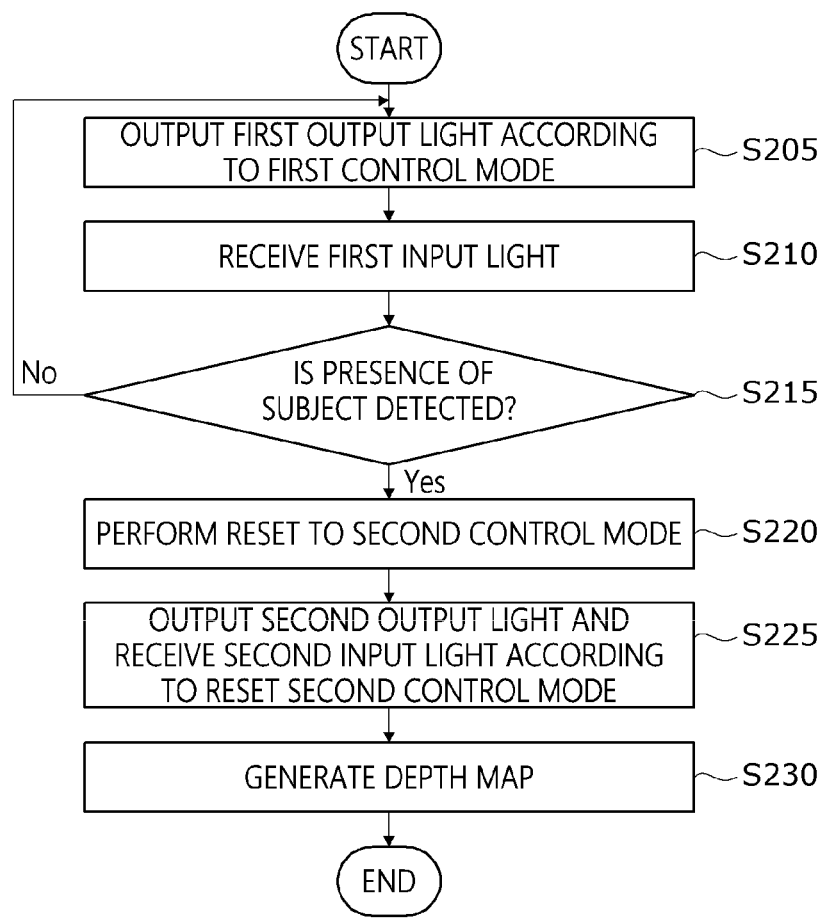

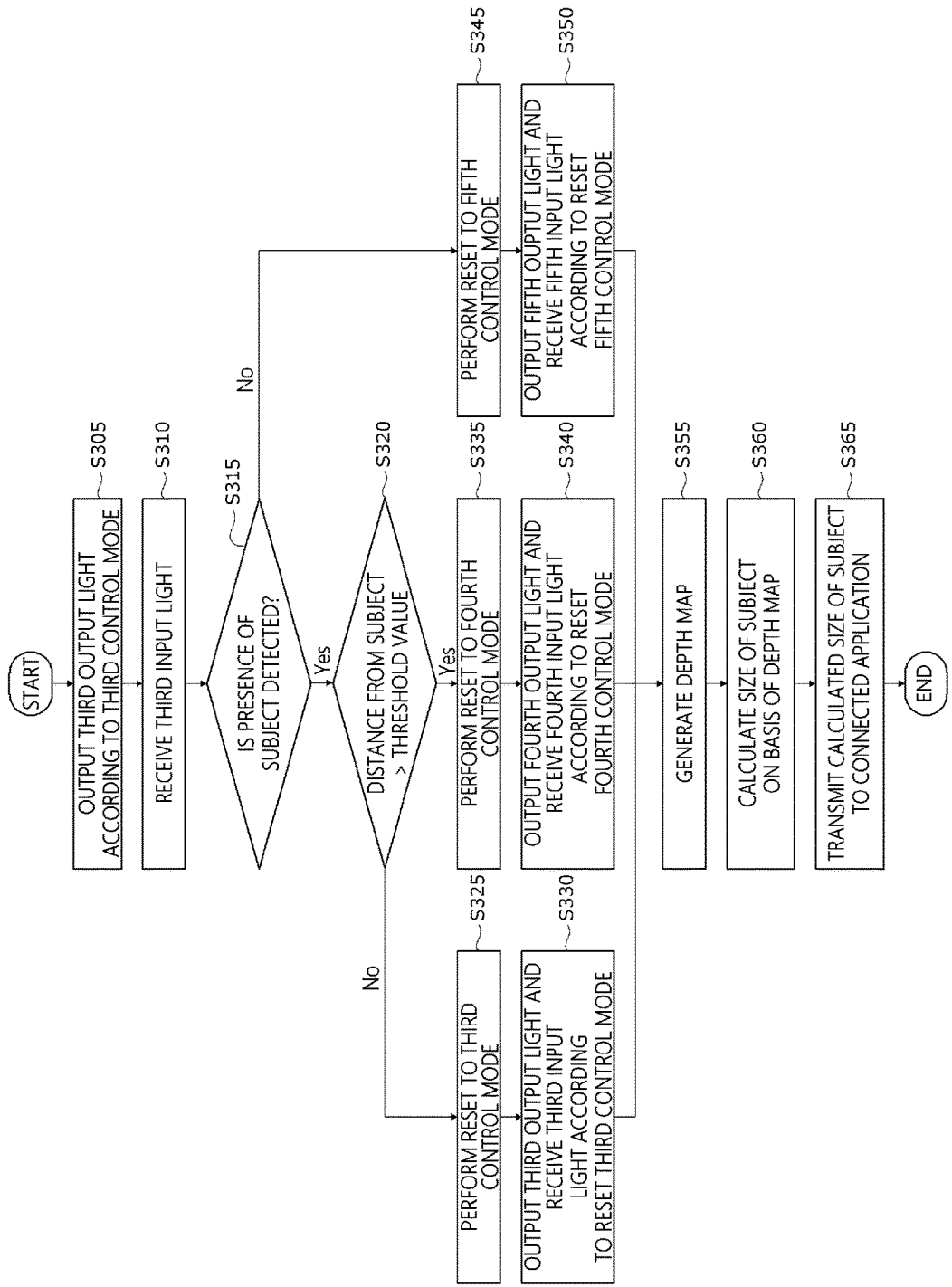
[FIG. 3]

[FIG. 4]
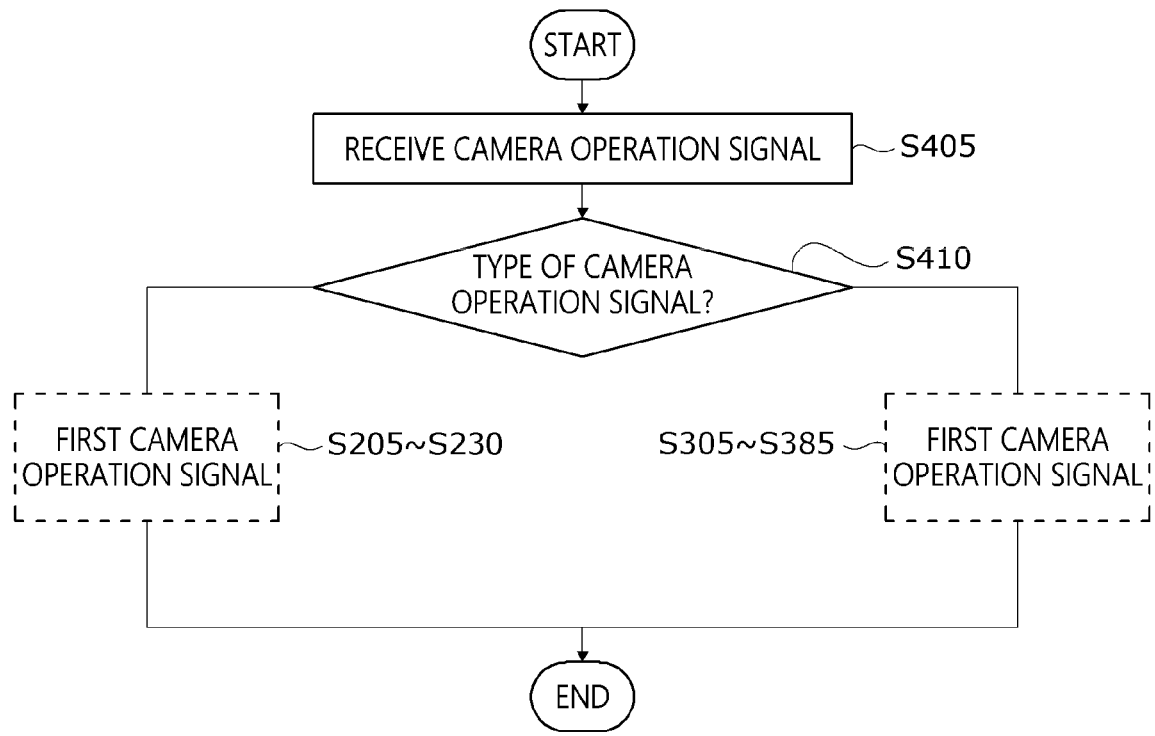
[FIG. 5]
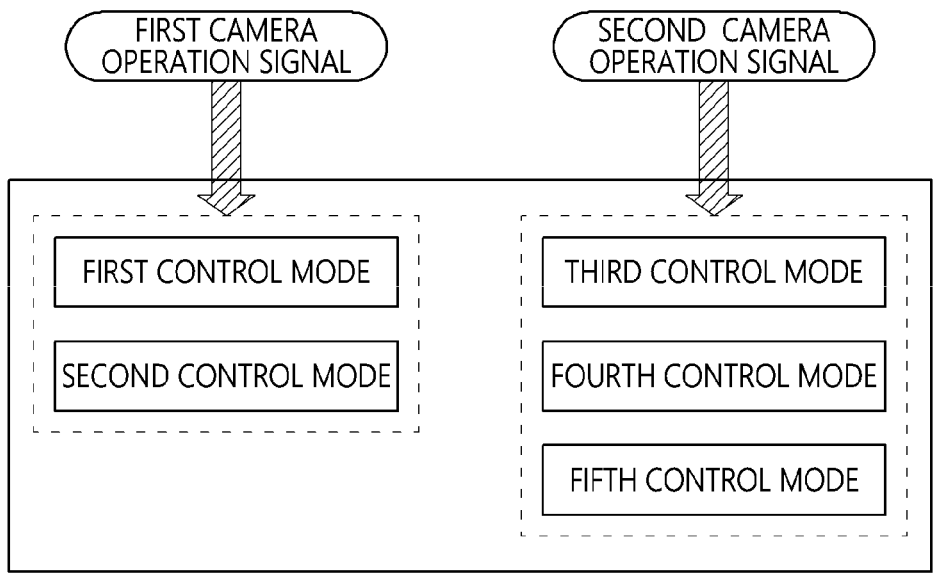

[FIG. 6]
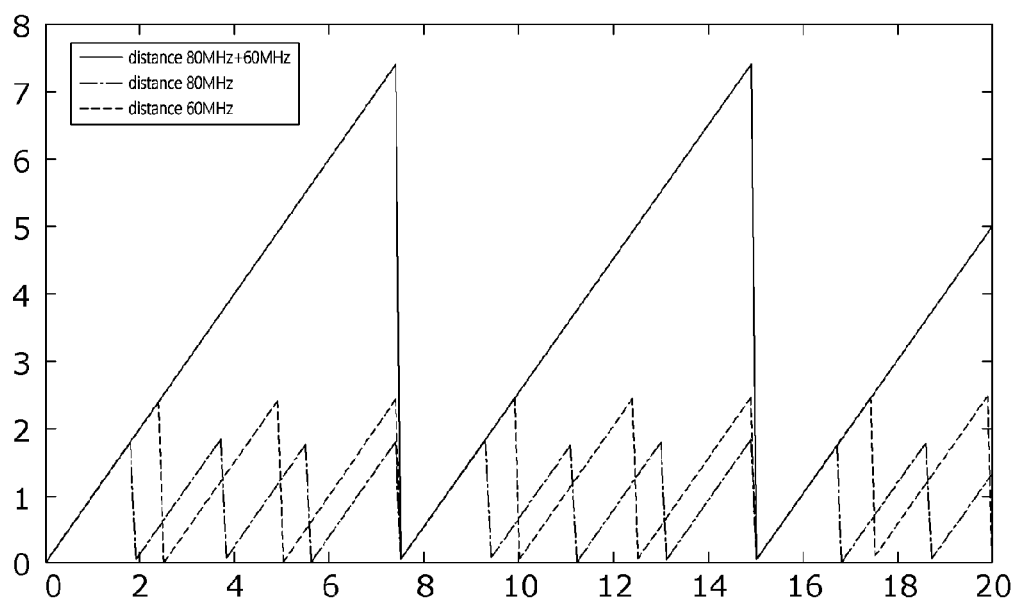
[FIG. 7]
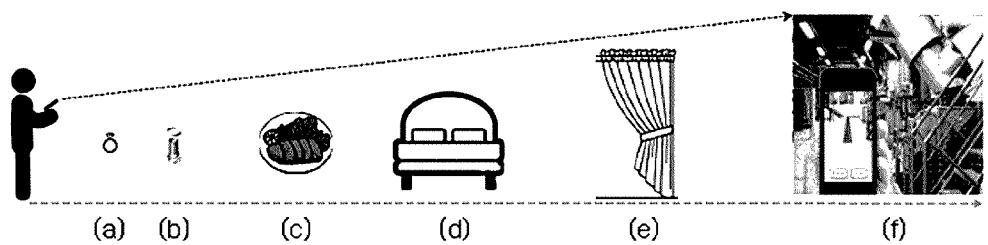
(a) (b) (c) (d) (e) (f)

CAMERA

CROSS REFERENCE TO RELATED APPLICATIONS

This application is the National Phase of PCT International Application No. PCT/KR2019/009645, filed on Aug. 2, 2019, which claims priority under 35 U.S.C. 119(a) to Patent Application No. 10-2018-0091898, filed in the Republic of Korea on Aug. 7, 2018, all of which are hereby expressly incorporated by reference into the present application.

TECHNICAL FIELD

An embodiment relates to a camera.

BACKGROUND ART

Technology for obtaining a 3D image using a photographing device is developing. In order to obtain a 3D image, depth information (depth map) is required. The depth information is information representing a distance in a space, and represents perspective information of another point with respect to one point of a 2D image.

One of methods of obtaining the depth information is a method of projecting infrared (IR) structured light onto an object and analyzing light reflected from the object to extract the depth information. According to the IR structured light method, there is a problem that it is difficult to obtain a desired level of depth resolution for a moving object.

A time of flight (TOF) method is attracting attention as a technology which replaces the IR structured light method. According to the TOF method, a distance from the object is calculated by measuring a flight time, that is, a time that light is emitted and reflected.

In general, in the case of the TOF method, in order to accurately measure a distance from a subject, an amount of light enough to illuminate a surface even from a long distance should be secured, and accordingly, a lot of power is consumed.

However, different specifications are required for each application that wants to use depth information obtained through a TOF camera. For example, in some applications, low-resolution depth information may be requested, or depth information of a small frame may be requested. In this case, when the TOF camera is driven in a manner for generating high-resolution depth information or high frame depth information, in addition to consuming unnecessary power, there is a problem that resource occupancy unnecessarily increases.

Therefore, there is a need for a technology capable of optimizing driving of the TOF camera.

DISCLOSURE

Technical Problem

An embodiment is directed to providing a camera, particularly, a camera capable of providing a TOF camera driving method optimized for a subject photographing situation.

The problems of embodiments to be solved are not limited thereto, and also include objectives and effects which can be grasped from technical solutions or the modes of invention described below.

Technical Solution

One aspect of the present invention provides a camera including: a light-emitting module configured to output output light according to a set control mode; a light-receiving module configured to receive input light corresponding to the output light according to the control mode; and a control module configured to detect at least one of presence of a subject and a distance from the subject on the basis of the input light, reset the control mode according to a detection result, control the output of the light-emitting module and an input of the light-receiving module according to the reset control mode, and generate a depth map for the subject on the basis of the input light which is input according to the reset control mode.

The control mode may include a first control mode and a second control mode, and at least one of a light exposure time of the light-emitting module, and a frame rate and the number of activated pixels of the light-receiving module may be set differently in the first control mode and the second control mode.

When a camera operation signal is input, the light-emitting module may output first output light according to the preset first control mode, and the light-receiving module may receive first input light corresponding to the first output light according to the first control mode.

As a result of detecting the presence of the subject on the basis of the first input light, when the subject is detected, the control module resets to the second control mode, the light-emitting module may output second output light according to the second control mode, and the light-receiving module may receive second input light reflected from the subject.

The control mode may include third to fifth control modes, and at least one of the light exposure time and a modulation frequency of the light-emitting module may be set differently in the third to fifth control modes.

The modulation frequency may be set to a first frequency in the third control mode, the modulation frequency may be set to a second frequency having a greater value than that of the first frequency in the fourth control mode, and the modulation frequency may be set to the first frequency and the second frequency in the fifth control mode.

When a camera operation signal is input, the light-emitting module may output third output light according to the third control mode, and the light-receiving module may receive third input light corresponding to the third output light according to the third control mode.

As a result of detecting the presence of the subject on the basis of the third input light, when the subject is detected, the control module may calculate the distance from the subject on the basis of the third input light, and when the subject is not detected, the control module may perform reset to be changed to the fifth control mode, the light-emitting module may output fifth output light to the subject according to the reset fifth control mode, and the light-receiving module may receive fifth input light reflected from the subject.

When the distance from the subject is greater than or equal to a threshold value, the control module may perform reset so that the third control mode is maintained, the light-emitting module may output the third output light to the subject according to the reset third control mode, and the light-receiving module ma receive the third input light reflected from the subject, and when the distance from the subject is smaller than the threshold value, the control module may perform reset to be changed to the fourth control mode, the light-emitting module may output fourth output light to the subject according to the reset fourth control mode, and the light-receiving module may receive fourth input light reflected from the subject.

The control module may generate the depth map for the subject on the basis of one of the third to fifth input light reflected from the subject, and when the depth map is generated on the basis of the third input light or the fifth input light reflected from the subject, the control module may generate the depth map having a higher resolution than that of the depth map on the basis of the fourth input light through a super resolution method.

The control module may calculate the size of the subject on the basis of depth information on the generated depth map and transmit the calculated size of the subject to a connected application.

DESCRIPTION OF DRAWINGS

FIG. 1 is a block diagram of a camera according to an embodiment of the present invention.

FIG. 2 is a flow chart illustrating a first example of a camera control method according to the embodiment of the present invention.

FIG. 3 is a flow chart illustrating a second example of the camera control method according to the embodiment of the present invention.

FIG. 4 is a flow chart illustrating a third example of the camera control method according to the embodiment of the present invention.

FIG. 5 is a diagram for describing a control mode according to the embodiment of the present invention.

FIG. 6 is a diagram for describing a fifth control mode according to the embodiment of the present invention.

FIG. 7 is a diagram for describing an optimized camera operation according to the embodiment of the present invention.

MODES OF THE INVENTION

Hereinafter, exemplary embodiments of the present invention will be described in detail with reference to the accompanying drawings.

However, a technical idea of the present invention is not limited to some embodiments to be described, but may be implemented in various different forms, and within a scope of a technical idea of the present invention, one or more of components may be selectively combined and substituted between the embodiments.

In addition, terms (including technical and scientific terms) used in the embodiments of the present invention may have meanings which can be interpreted as commonly understood by one of ordinary skill in the art, unless explicitly defined and described, and commonly used terms such as terms defined in the dictionary may be interpreted in consideration of the meaning of the context of the related technology.

In addition, terms used in the embodiments of the present invention are for describing the embodiments and are not intended to limit the present invention.

In the present specification, a singular form may include a plural form unless specifically stated in the phrase, and when described as "at least one (or more than one) of A and B or A, B and C", it may include one or more of all combinations which can be combined with A, B, and C.

In addition, terms such as first, second, A, B, (a), and (b) may be used in describing components of an embodiment of the present invention.

These terms are only for distinguishing the component from other components, and are not limited to the nature, sequence, or order of the component by the term.

Moreover, when one component is described as being "connected", "coupled", or "joined" to another component, one component may be directly connected, coupled, or connected to another component, and one component may be "connected", "coupled", or "joined" to another component through still another component disposed between one component and another component.

In addition, a case where it is described that a component is formed or disposed "above (upper) or below (lower)" of another component includes not only a case where the two components are in direct contact with each other but also a case where one or more other components are formed or disposed between the two components. In addition, a case where it is expressed as "above (upper) or below (lower)" may include the meaning of not only an upward direction but also a downward direction based on one component.

First, a configuration of a camera according to an embodiment of the present invention will be described with reference to FIG. 1.

FIG. 1 is a block diagram of the camera according to an embodiment of the present invention.

As illustrated in FIG. 1, a camera 100 according to the embodiment of the present invention includes a light-emitting module 110, a light-receiving module 120, and a control module 130.

First, the light-emitting module 110 outputs output light according to a set control mode. The light-emitting module 110 may include a light source and a light modulator to output the output light.

The light source generates light. The light generated by the light source may be infrared rays having a wavelength of 770 to 3000 nm, or visible light having a wavelength of 380 to 770 nm. The light source may be implemented through a light emitting diode (LED), and may be implemented in a form in which a plurality of light emitting diodes are arranged according to a predetermined pattern. In addition, the light source may include an organic light emitting diode (OLED) or a laser diode (LD). The light source repeats blinking (on/off) at a predetermined time interval to output the output light in the form of a pulse wave or a continuous wave. All of the plurality of light emitting diodes may repeat the blinking at the same time interval. In addition, all of the plurality of light emitting diodes may repeat the blinking at different time intervals for a portion of a light exposure time. In addition, among the plurality of light-emitting diodes, a first set of light-emitting diodes and a second set of light-emitting diodes may repeat the blinking at different time intervals.

The light modulator controls the blinking of the light source according to a control mode. The light modulator may control the blinking of the light source so that output light having a modulation frequency according to the control mode is output through frequency modulation, pulse modulation, or the like. Moreover, the light modulator may control the blinking of the light source to output the output light during the light exposure time according to the control mode.

Next, the light-receiving module 120 receives input light corresponding to the output light according to the control mode. The light-receiving module 120 may include a lens unit and an image sensor unit to receive the input light.

The lens unit condenses the input light and transfers the condensed light to the image sensor unit. To this end, the lens unit may include a lens, a lens barrel, a lens holder, and an IR filter.

A plurality of lenses may be provided or one lens may be provided. When the plurality of lenses are provided, the respective lenses may be aligned based on a central axis to form an optical system. Here, the central axis may be the same as an optical axis of the optical system.

The lens barrel may be coupled to the lens holder, and may have a space to accommodate the lens therein. The lens barrel may be rotationally coupled to one lens or a plurality of lenses. However, this is exemplary and the lens barrel may be coupled to one lens or the plurality of lenses in a different manner, such as a method using an adhesive (for example, an adhesive resin such as epoxy).

The lens holder may be coupled to the lens barrel to support the lens barrel, and may be coupled to a printed circuit board on which an image sensor is mounted. The lens holder may have a space, in which the IR filter can be attached, below the lens barrel. A helical pattern is formed on an inner peripheral surface of the lens holder, and the lens holder may be rotationally coupled to the lens barrel having a helical pattern formed on an outer peripheral surface similarly. However, this is exemplary, and the lens holder and the lens barrel may be coupled to each other through an adhesive, or the lens holder and the lens barrel may be integrally formed with each other.

The lens holder may be divided into an upper holder coupled to the lens barrel and a lower holder coupled to the printed circuit board on which the image sensor is mounted, and the upper holder and the lower holder may be integrally formed with each other or may be formed in a separate structure and then fastened or coupled to each other. In this case, a diameter of the upper holder may be formed to be smaller than a diameter of the lower holder. In the present specification, the lens holder may be a housing.

The image sensor unit absorbs the condensed input light to generate an electrical signal.

The image sensor unit may absorb the input light in synchronization with a blinking period of the light source. Specifically, the image sensor unit may absorb the input light in phase and out of phase with the output light. That is, the image sensor unit may repeatedly perform a step of absorbing the input light when the light source is turned on and a step of absorbing the input light when the light source is turned off.

The image sensor unit may generate an electrical signal corresponding to each reference signal using a plurality of reference signals having different phase differences. A frequency of the reference signal may be set to be equal to a frequency of the output light. Accordingly, when the output light is output at a plurality of frequencies, the image sensor unit generates the electrical signal using a plurality of reference signals corresponding to the respective frequencies. The electrical signal may include information on an amount of charge or voltage corresponding to each reference signal.

According to the embodiment of the present invention, there may be four reference signals $C_1$ to $C_4$. Each of the reference signals $C_1$ to $C_4$ may have the same frequency as the output light and may have a phase difference of 90° from each other. One $C_1$ of the four reference signals may have the same phase as that of the output light. A phase of the input light is delayed by a distance that the output light is reflected and returned after the output light is incident on an object. The image sensor unit may mix the input light and each reference signal to generate an electrical signal for each reference signal.

In another embodiment, when the output light is generated at a plurality of frequencies during the light exposure time, the image sensor unit absorbs the input light according to the plurality of frequencies. For example, it is assumed that the output light is generated at frequencies $f_1$ and $f_2$, and a plurality of reference signals have a phase difference of 90°. Then, since the input light also has frequencies $f_1$ and $f_2$, four electrical signals may be generated through the input light having the frequency of $f_1$ and four reference signals corresponding to the input light. In addition, four electrical signals may be generated through the input light having the frequency of $f_2$ and four reference signals corresponding to the input light. Thus, a total of 8 electrical signals may be generated.

The image sensor unit may be implemented as an image sensor in which a plurality of photodiodes are arranged in a grid shape. The image sensor may be a Complementary Metal Oxide Semiconductor (CMOS) image sensor, or may be a Charge Coupled Device (CCD) image sensor.

Meanwhile, the light-emitting module 110 and the light-receiving module 120 may be implemented in plural in the camera. For example, when the camera according to the embodiment of the present invention is included in a smartphone, a first light-emitting module 110 and a first light-receiving module 120 corresponding thereto may be disposed on a front surface of the smartphone, and a second light-emitting module 110 and a second light-receiving module 120 corresponding thereto may be disposed on a rear surface of the smartphone.

Next, the control module 130 detects at least one of presence of a subject and a distance from the subject on the basis of the input light. Specifically, the control module 130 may detect at least one of the presence of the subject and the distance from the subject through a depth map generated through the input light. For example, the control module 130 may generate the depth map through the electrical signal corresponding to the input light. When the output light is output in the form of a continuous wave, the distance from the subject may be detected using Equation 1 below.

$$d = \frac{1}{2f} c \frac{\phi}{2\pi} \qquad \text{[Equation 1]}$$

Here, f represents a frequency of the output light, c represents a speed of the light, and φ represents a phase difference between the output light and the corresponding input light.

In addition, the phase difference between the output light and the corresponding input light may be calculated through Equation 2 below.

$$\phi = 2\pi f_\tau = \text{acrtan}\left(\frac{Q_3 - Q_4}{Q_1 - Q_2}\right) \qquad \text{[Equation 2]}$$

Here, τ represents a time of flight. Each of $Q_1$ to $Q_4$ is an amount of charged charge of each of the four electrical signals. $Q_1$ is an amount of charge of an electrical signal corresponding to a reference signal of the same phase as an incident light signal. $Q_2$ is an amount of charge of an electrical signal corresponding to a reference signal whose phase is slower by 180° than the incident light signal. $Q_3$ is an amount of charge of an electrical signal corresponding to a reference signal whose phase is slower by 90° than the incident light signal. $Q_4$ is an amount of charge of an electrical signal corresponding to a reference signal whose phase is slower by 270° than the incident light signal.

The control module 130 resets the control mode according to a detection result of at least one of the presence of the subject and the distance from the subject.

Specifically, when the presence of the subject is detected, the control module 130 resets a set first control mode to a second control mode. Meanwhile, when the presence of the subject is not detected, the control module 130 performs the reset so that the set first control mode is maintained.

Alternatively, when the presence of the subject is detected and the distance from the subject is greater than or equal to a threshold value, the reset is performed so that a set third control mode is maintained. Moreover, when the presence of the subject is detected and the distance from the subject is greater than or equal to the threshold value, the control module 130 may perform the reset so that the set third control mode is changed to a fourth control mode. Meanwhile, if the presence of the subject is not detected, the control module 130 performs the reset so that the set third control mode is changed to a fifth control mode.

The control module 130 controls the output of the light-emitting module 110 and the input of the light-receiving module 120 according to the reset control mode. The control module 130 generates the depth map for the subject on the basis of the input light input according to the reset control mode. A process of generating the depth map is the same as described through the above Equations, and thus detailed descriptions thereof will be omitted.

Meanwhile, when the depth map is generated on the basis of third input light or fifth input light reflected from the subject, the control module 130 may generate a depth map having a resolution higher than the depth map on the basis of fourth input light, through a super resolution method.

For example, when the depth map on the basis of the fourth input light has a resolution of a QVGA (320×240) level, the depth map on the basis of the third input light or the fifth input light may have a resolution of a VGA (640×480) level.

The super resolution method, that is, a super resolution (SR) technique, is a technique for obtaining a high-resolution image from a plurality of low-resolution images, and a mathematical model of the SR technique may be expressed as Equation 3 below.

$$y_k = D_k B_k M_k x + n_k$$

Here, 1≤k≤p, p represents the number of low-resolution images, $y_k$ represents the low-resolution image (=$[y_{k,1}, y_{k,2}, \ldots, y_{k,M}]^T$, where M=$N_1*N_2$), $D_k$ represents a down sampling matrix, $B_k$ represents an optical blur matrix, $M_k$ is an image warping matrix, x represents the high-resolution image (=$[x_1, x_2, \ldots, x_N]^T$, where N=$L_1N_1*L_2N_2$), and $n_k$ represents noise. That is, according to the SR technique, it refers to a technique of estimating x by applying an inverse function of estimated resolution degradation elements to $y_k$. The SR technique can be largely divided into a statistical method and a multi-frame method, and the multi-frame method can be largely divided into a space division method and a time division method.

The control module 130 may transmit the depth map for the subject to a connected application. In addition, the control module 130 may detect the size of the subject through the depth map for the subject, and transmit detected size information to the connected application.

FIG. 2 is a flow chart illustrating a first example of a camera control method according to the embodiment of the present invention.

Referring to FIG. 2, when a camera operation signal is input, the light-emitting module outputs first output light according to a set first control mode (S205). Then, the light-receiving module 120 receives first input light corresponding to the first output light according to the set first control mode (S210).

Next, the control module 130 detects the presence of the subject on the basis of the first input light (S215).

When the presence of the subject is detected, the control module 130 performs the reset so that the set first control mode is changed to the second control mode (S220).

Then, according to the reset second control mode, the light-emitting module 110 outputs second output light and the light-receiving module 120 receives second input light reflected from the subject (S225).

Then, the control module 130 generates the depth map for the subject on the basis of the second input light (S230).

Meanwhile, when the presence of the subject is not detected, after the reset is performed so that the first control mode is maintained, it proceeds again from Step S205, and when the subject is not detected while a predetermined number of times is repeated, termination may be performed.

FIG. 3 is a flow chart illustrating a second example of the camera control method according to the embodiment of the present invention.

When the camera operation signal is input, the light-emitting module 110 outputs third output light according to the preset third control mode (S305).

Then, the light-receiving module 120 receives third input light corresponding to the third output light according to the set third control mode (S310).

Next, the control module 130 detects the presence of the subject on the basis of the third input light (S315).

When the presence of the subject is detected, the control module 130 calculates the distance from the subject on the basis of the third input light, and compares the calculated distance from the subject and a threshold value (S320).

In this case, when the distance from the subject is greater than or equal to the threshold value, the control module 130 performs the reset so that the third control mode is maintained (S325). Then, according to the reset third control mode, the light-emitting module 110 outputs the third output light to the subject, and the light-receiving module 120 receives the third input light reflected from the subject (S330).

When the distance from the subject is smaller than the threshold value, the control module 130 performs the reset so that the set third control mode is changed to the fourth control mode (S335). Then, according to the reset fourth control mode, the light-emitting module 110 outputs fourth output light to the subject, and the light-receiving module 120 receives fourth input light reflected from the subject (S340).

Meanwhile, when the subject is not detected, the control module 130 performs the reset so that the preset third control mode is changed to the fifth control mode (S345). Then, according to the reset fifth control mode, the light-emitting module 110 outputs fifth output light to the subject, and the light-receiving module 120 receives fifth input light reflected from the subject (S350).

Then, the control module 130 generates the depth map for the subject on the basis of any one of the third to fifth input light (S355). The process of generating the depth map is the same as described through the above Equations, and thus detailed descriptions thereof will be omitted. Meanwhile, when the depth map is generated on the basis of the third input light or fifth input light reflected from the subject, the control module 130 may generate a depth map having a resolution higher than the depth map on the basis of the fourth input light reflected from the subject, through the super resolution method.

Further, the control module 130 may calculate the size of the subject on the basis of the depth information of the generated depth map (S360) and transmit the size of the subject to a connected application (S365). In this case, the connected application may be an application to which the camera operation signal of Step S305 is input.

FIG. 4 is a flow chart illustrating a third example of the camera control method according to the embodiment of the present invention.

According to the camera control method illustrated in FIG. 4, the camera control method illustrated in FIG. 3 and the camera control method illustrated in FIG. 4 may be implemented together.

Referring to FIG. 4, when the control module 130 receives the camera operation signal (S405), the type of the camera operation signal is determined (S410). In this case, the control module 130 may operate the first light-emitting module 110 and the first light-receiving module 120 or may operate the second light-emitting module 110 and the second light-receiving module 120 according to the type of the camera operation signal.

Specifically, when the input camera operation signal is a first camera operation signal, the control module 130 may operate the first light-emitting module 110 and the first light-receiving module 120. Then, the control module 130 performs a camera control according to the camera control method illustrated in FIG. 2. For example, when a user inputs the first camera operation signal through a button input or motion input for 3D face recognition, the control module 130 may operate the first light-emitting module 110 and the first light-receiving module 120 to perform the camera control according to Steps S205 to S230 of FIG. 2.

Meanwhile, when the input camera operation signal is a second camera operation signal, the control module 130 may operate the second light-emitting module 110 and the second light-receiving module 120. Then, the control module 130 performs the camera control according to the camera control method illustrated in FIG. 3. For example, when the user inputs the second camera operation signal through an application to detect the size of an object, the control module 130 may operate the second light-emitting module 110 and the second light-receiving module 120 to perform the camera control according to Steps S305 to S365.

Steps S205 to S230 and Steps 305 to S355 are described with reference to FIGS. 2 and 3 above, and thus, detailed descriptions thereof will be omitted.

FIG. 5 is a diagram for describing the control mode according to the embodiment of the present invention.

With reference to FIG. 5, the control mode according to the embodiment of the present invention may include first to fifth control modes, the first and second control modes may be grouped, and the third to fifth control modes may be grouped.

Specifically, the camera according to the embodiment of the present invention may be controlled according to one of the first control mode and the second control mode according to the camera operation signal.

The first control mode may be a control mode for searching for the subject, and the second control mode may be a control mode for accurately measuring the subject. For example, in the case of face recognition, the first control mode may be a control mode for detecting the presence of the face (subject), and the second control mode may be a control mode for generating the depth map for the face (subject).

Table 1 below is a table illustrating the characteristics of the first control mode and the second control mode.

TABLE 1

| Mode | Distance range | Depth accuracy | Angle of view of light-receiving module | Light exposure time | Frame rate | Light-receiving unit and |
|---|---|---|---|---|---|---|
| First control mode | ~100 cm | <10% | 40°~60° | <0.1 ms | 1 fps | <20 mW |
| Second control mode | ~60 cm | <1% | 80° | <0.7 ms | >15 fps | >150 mW |

As illustrated in Table 1, in the first control mode and the second control mode, at least one of a light exposure time of the light-emitting module 110, and a frame rate and the number of activated pixels of the light-receiving module 120 may be set differently. In addition, effects of this are also different. Specifically, the light exposure time of the light-emitting module 110 in the first control mode may be set to be shorter than the light exposure time of the second control mode. For example, the light exposure time of the first control mode may be set to be shorter than 0.1 ms, and the light exposure time of the second control mode may be set to be longer than 0.7 ms.

The frame rate of the light-receiving module 120 in the first control mode may be set to be smaller than the frame rate of the second control mode. For example, the frame rate of the first control mode may be set to 1 fps, and the frame rate of the second control mode may be set to be greater than 15 fps. In particular, since the first control mode is for detecting the presence of a subject, the frame rate of the light-receiving module 120 may be set to 1 fps so as to generate only one frame.

The number of activated pixels of the light-receiving module 120 in the first control mode may be set to be smaller than the number of activated pixels thereof in the second control mode. That is, an angle of view of the light-receiving module 120 in the first control mode may be set to be smaller than an angle of view of the light-receiving module 120 in the second control mode. For example, in the first control mode, 112×86 pixels may be activated and the angle of view of the light-receiving module 120 may be set to 40°, and in the second control mode, 224×172 pixels may be activated and the angle of view of the light-receiving module 120 may be set to 80°.

When the camera according to the embodiment of the present invention is operated according to the first control mode, a depth accuracy is lower than that of the second control mode, but the subject located at a longer distance can be measured with a small amount of power. That is, after the presence of the subject is detected with a small amount of power, when it is determined that the subject exists, precise photographing is performed according to the second control mode, and thus, power consumption of the camera can be reduced.

Next, the camera according to the embodiment of the present invention may be controlled according to any one of the third to fifth control modes according to the camera operation signal.

Table 2 below is a table illustrating the characteristics of the third to fifth control modes.

TABLE 2

| Mode | Distance range | Resolution | Light exposure time | Modulation frequency | Power consumption |
| --- | --- | --- | --- | --- | --- |
| Third control mode | ~2 m | VGA | >1.5 ms | 60 MHz | >50 mW |
| Fourth control mode | ~1 m | QVGA | <1.5 ms | 80 MHz | >25 mW |
| Fifth control mode | 4 m~ | VGA | >1.5 ms | 80 MHz + 60 MHz | >100 mW |

As illustrated in Table 2, in the third to fifth control modes, at least one of the light exposure time and the modulation frequency of the light-emitting module 110 may be set differently. The light exposure time of the light-emitting module 110 in the fourth control mode may be set to be smaller than the light exposure times of the third control mode and the fifth control mode. For example, the light exposure time of the fourth control mode may be set to be less than 1.5 ms, and the light exposure times of the third control mode and the fifth control mode may be set to be greater than 1.5 ms. The fourth control mode is a control mode for photographing the subject located at a short distance such as within 1 m, and thus, even when the light exposure time is shorter than those of the third and fifth control modes, the light-receiving module 120 can secure an amount of light sufficient to generate the depth map.

In the third control mode, the modulation frequency is set to a first frequency, the fourth control mode is set to a second frequency whose modulation frequency is greater than the first frequency, and in the fifth control mode, the modulation frequency may be set to a combination of the first frequency and the second frequency, that is, two frequencies. For example, the modulation frequency may be set to 60 MHz in the third control mode, the modulation frequency may be set to 80 MHz in the fourth control mode, and the modulation frequency may be set to 60 MHz and 80 MHz in the fifth control mode.

As illustrated in Table 2, the camera according to the embodiment of the present invention controls the light-emitting module 110 and the light-receiving module 120 differently according to the distance from the subject through the third to fifth control modes. That is, since the camera is operated with the control module 130 optimized according to the distance from the subject, it is possible to reduce the power consumption of the camera.

FIG. 6 is a diagram for describing the fifth control mode according to the embodiment of the present invention.

FIG. 6 illustrates a process of combining two modulation frequencies. For example, it is assumed that the first frequency is 60 MHz and the second frequency is 80 MHz.

The maximum distance at which the subject can be measured is determined according to the frequency of the output light, the subject located at a maximum of 1.8657 m can be measured by the output light according to the first frequency of 60 MHz, and the subject located at a maximum of 2.4876 m can be measured by the output light according to the second frequency of 80 MHz. In this way, as the frequency increases, the maximum distance at which the subject can be measured increases. However, in order to increase the frequency, it is necessary to quickly control the blinking period of the light-emitting module 110, and thus, power consumption increases.

Accordingly, in the fifth control mode according to the embodiment of the present invention, the measurement distance of the subject can be increased by simultaneously outputting the first frequency and the second frequency.

As illustrated in FIG. 6, when the output light according to the first frequency and the output light according to the second frequency are output at the same time, the first frequency and the second frequency form a waveform with different periods, and a portion of the phases of the two frequencies overlapping each other may occur. In this way, when two frequencies are output at the same time, a portion where the phases of the two frequencies overlap each other can be viewed as one period. That is, when the frequencies of 60 MHz and 80 MHz are output at the same time, it can be regarded as one output light having a frequency of 240 MHz. In this case, compared to outputting the output light having the frequency of 240 MHz, power consumption can be reduced largely.

FIG. 7 is a diagram for describing an optimized camera operation according to the embodiment of the present invention.

FIG. 7 illustrates an example for describing a camera operation according to the camera control method illustrated in FIG. 3. As illustrated in FIG. 7, when photographing a subject with a small size such as a ring, a bolt, and food illustrated in (a) to (c), the user takes a photograph after placing the camera at a position close to the subject. In this case, the control module 130 generates the depth map by photographing the subject according to the fourth control mode on the basis of the information on the presence of the subject and the distance from the subject according to the third control mode.

When a relatively large subject, such as a sofa or a curtain illustrated in (d) and (e), is photographed, the user takes a photograph after placing the camera at a position which is equal to or more than a certain distance from the subject. In this case, the control module 130 generates the depth map by photographing the subject according to the third control mode.

Meanwhile, as illustrated in (f), when photographing is performed for indoor positioning, the user takes a photograph after placing the camera at a location far away from the subject. In this case, the control module 130 generates the depth map by photographing the subject according to the fifth control mode on the basis of the information on the presence of the subject according to the third control mode.

The invention claimed is:

1. A camera comprising:
    a light-emitting module configured to output output light according to a set control mode;
    a light-receiving module configured to receive input light corresponding to the output light according to the control mode; and
    a control module configured to:
        detect at least one of presence of a subject and a distance from the subject on the basis of the input light;
        reset the control mode according to a detection result;
        control an output of the light-emitting module and an input of the light-receiving module according to the reset control mode; and generate a depth map for the subject on the basis of the input light which is input according to the reset control mode, wherein the control module is further configured to, when the presence of the subject is not detected by the control module, control the output of the light-emitting module according to the set control mode and to repeat detecting at least one of presence of the subject and the distance from the subject on the basis of the input light.

2. A camera comprising:
a light-emitting module configured to output output light according to a set control mode;
a light-receiving module configured to receive input light corresponding to the output light according to the control mode; and
a control module configured to detect at least one of presence of a subject and a distance from the subject on the basis of the input light, reset the control mode according to a detection result, control an output of the light-emitting module and an input of the light-receiving module according to the reset control mode, and generate a depth map for the subject on the basis of the input light which is input according to the reset control,
wherein the control mode is selected from one of first to fifth control modes,
wherein at least one of the light exposure time and a modulation frequency of the light-emitting module is set differently in the third to fifth control modes,
wherein, in the third control mode, the modulation frequency is set to a first frequency,
wherein, in the fourth control mode, the modulation frequency is set to a second frequency having a value greater than that of the first frequency, and
wherein, in the fifth control mode, the modulation frequency is set to a combination of the first frequency and the second frequency.

3. The camera of claim 2, wherein at least one of a light exposure time of the light-emitting module, and a frame rate and the number of activated pixels of the light-receiving module is set differently in the first control mode and the second control mode.

4. The camera of claim 3, wherein when a camera operation signal is input, the light-emitting module outputs first output light according to the preset first control mode, and
wherein the light-receiving module receives first input light corresponding to the first output light according to the first control mode.

5. The camera of claim 4, wherein as a result of detecting the presence of the subject on the basis of the first input light, when the subject is detected, the control module resets the first control mode to the second control mode.

6. The camera of claim 5, wherein the light-emitting module outputs second output light according to the second control mode, and the light-receiving module receives second input light reflected from the subject.

7. The camera of claim 4, wherein as a result of detecting the presence of the subject on the basis of the first input light, when the subject is not detected, the control module maintains the first control mode and the light-emitting module repeats the output of the first output light according to the first control mode.

8. The camera of claim 2, wherein the first frequency is a frequency in the 60 MHz band, and the second frequency is a frequency in the 80 MHz band.

9. The camera of claim 2, wherein when a camera operation signal is input, the light-emitting module outputs third output light according to the third control mode, and
wherein the light-receiving module receives third input light corresponding to the third output light according to the third control mode.

10. The camera of claim 9, wherein as a result of detecting the presence of the subject on the basis of the third input light, when the subject is detected, the control module calculates the distance from the subject on the basis of the third input light.

11. The camera of claim 10, wherein when the distance from the subject is greater than or equal to a threshold value, the control module performs a reset so that the third control mode is maintained, the light-emitting module outputs the third output light to the subject according to the reset third control mode, and the light-receiving module receives the third input light reflected from the subject.

12. The camera of claim 11, wherein when the distance from the subject is smaller than the threshold value, the control module performs a reset to be changed to the fourth control mode, the light-emitting module outputs fourth output light to the subject according to the reset fourth control mode, and the light-receiving module receives fourth input light reflected from the subject.

13. The camera of claim 9, wherein as a result of detecting the presence of the subject on the basis of the third input light, when the subject is not detected, the control module performs reset to be changed to the fifth control mode, the light-emitting module outputs fifth output light to the subject according to the reset fifth control mode, and the light-receiving module receives fifth input light reflected from the subject.

14. The camera of claim 13, wherein the control module generates the depth map for the subject on the basis of one of the third to fifth input lights reflected from the subject, and
wherein when the depth map is generated on the basis of the third input light or the fifth input light reflected from the subject, through a super resolution method, the control module generates the depth map having a resolution higher than that of the depth map on the basis of the fourth input light.

15. The camera of claim 2, wherein the light-emitting module includes a first light-emitting module and a second light-emitting module, and the light-receiving module includes a first light-receiving module corresponding to the first light-emitting module and a second light-receiving module corresponding to the second light-emitting module.

16. The camera of claim 15, wherein the control module, when a first camera operation signal is input, the control module operates the first light-emitting module and the first light-receiving module, when a second camera operation signal is input, the control module operates the second light-emitting module and the second light-receiving module.

17. The camera of claim 16, wherein the first light-emitting module and the first light-receiving module are operated through the first control mode or the second control mode.

18. The camera of claim 17, wherein the second light-emitting module and the second light-receiving module are operated through the third to fifth control mode.

* * * * *